United States Patent
Yi et al.

(10) Patent No.: US 7,940,936 B2
(45) Date of Patent: May 10, 2011

(54) PUBLIC KEY GENERATION METHOD IN ELLIPTIC CURVE CRYPTOGRAPHY AND PUBLIC KEY GENERATION SYSTEM EXECUTING THE METHOD

(75) Inventors: Jeong Hyun Yi, Daejeon (KR); Sergey Bezzateev, St. Petersburg (RU); Tae-Chul Jung, Seongnam-si (KR); Eun Ah Kim, Seoul (KR); Mikhail Stepanov, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1013 days.

(21) Appl. No.: 11/802,654

(22) Filed: May 24, 2007

(65) Prior Publication Data

US 2008/0144816 A1   Jun. 19, 2008

(30) Foreign Application Priority Data

Dec. 15, 2006   (KR) ......................... 10-2006-0128663

(51) Int. Cl.
 *H04L 9/30* (2006.01)
(52) U.S. Cl. .................. 380/278; 713/188; 380/285
(58) Field of Classification Search .................. None
 See application file for complete search history.

(56) References Cited

U.S. PATENT DOCUMENTS

| 6,212,279 B1 * | 4/2001 | Reiter et al. .................. 380/278 |
| 6,430,588 B1 * | 8/2002 | Kobayashi et al. ........... 708/492 |
| 2002/0041681 A1 * | 4/2002 | Hoffstein et al. ............. 380/28 |
| 2003/0123655 A1 * | 7/2003 | Lambert et al. ............... 380/28 |

FOREIGN PATENT DOCUMENTS

| JP | 2000-187438 | 7/2000 |
| JP | 4502817 B | 7/2010 |
| WO | WO 2004/070681 | 8/2004 |

OTHER PUBLICATIONS

Smart et al. Point Multiplication on Oridnary Elliptic Curves over Fields of Characteristic Three Apr. 2003 Springer Berlin/Heidelberg pp. 485-497.*

* cited by examiner

*Primary Examiner* — David J Pearson
(74) *Attorney, Agent, or Firm* — North Star Intellectual Property Law, PC

(57) ABSTRACT

A public key generation method in Elliptic Curve Cryptography (ECC), and a public key generation system performing the method are provided. The public key generation method includes reducing a sequence length of the signed ternary τ-adic representation of the private key 'k' using properties of an elliptic curve, representing a reduced secret key 'k' in a signed ternary τ-adic representation; and computing a public key kP by multiplying the τ-adic representation of the private key 'k' whose sequence length is reduced on point P on the elliptic curve.

18 Claims, 8 Drawing Sheets

| Algorithm 1 Ternary representation base $\tau$ |
|---|

1: INPUT: $k$, trace $t$

2: OUTPUT: Ternary representation of $k$ base $\tau$

3:     $a \leftarrow k, b \leftarrow 0, i \leftarrow 0$

4: repeat

5:     if $a \not\equiv 0 \bmod 3$ then

6:        $k_i \in \{0, 1, 2\} : k_i = a \bmod 3$

7:     end if

8:     $a \leftarrow a - k_i$

9:     $(a, b) \leftarrow (\frac{ta}{3} + b, -\frac{a}{3})$

10:    $a \leftarrow i + 1$

11: until $a \neq 0$ and $b \neq 0$

12: return($k_{i-1}, ..., k_1, k_0$)

| Algorithm 2 $\tau$-$adic$ computation method |
|---|
| 1: INPUT: $k$, $P \in E(F_{2^m})$ |
| 2: OUTPUT: $kP$ |
| 3: Precomputation $2P$ |
| 4: Use algorithm 4 to compute $\tau$-adic representation of $k = \sum_{i=0}^{l-1} k_i \tau^i$ |
| 5: $Q \leftarrow 0$ |
| 6: for $i \leftarrow l-1, 0$ do |
| 7:     $Q \leftarrow \tau Q$ |
| 8:     if $k_i = 1$ then |
| 9:         $Q \leftarrow Q + P$ |
| 10:    end if |
| 11:    if $k_i = 2$ then |
| 12:        $Q \leftarrow Q + 2P$ |
| 13:    end if |
| 14: end for |
| 15: return($Q$) |

| Algorithm 3 Signed ternary representation of the $x + y\tau$ base $\tau$ |
|---|
| 1: INPUT: $x, y$, trace $t$ |
| 2: OUTPUT: Signed ternary representation base $\tau$ |
| 3:     $a \leftarrow x, b \leftarrow y$ |
| 4: repeat |
| 5:     $k_i = a \mod 3$                                                                ▷ $k_i \in \{0, \pm 1\}$ |
| 6:     if $k_i = 2$ then $k_i = -1$ |
| 7:     end if |
| 8:     $a \leftarrow a + k_i$ |
| 9:     $k_i \leftarrow -k_i$ |
| 10:    $(a, b) \leftarrow \left(\frac{ta}{3} + b, -\frac{a}{3}\right)$ |
| 11:    $i = i + 1$ |
| 12: until $a \neq 0$ and $b \neq 0$ |
| 13: return$(k_{i-1}, ..., k_1, k_0)$ |

Algorithm 4 Finding residue of the complex number

1: INPUT: $a, b, c, d,$
2: OUTPUT: $e, f : e + f\tau = a + b\tau \mod c + d\tau$
3: $g \leftarrow -ad + bc$
4: $h \leftarrow ac + 2ad + 3bd$
5: $m \leftarrow (c+d)^2 + 2d^2$
6: $p \leftarrow \lfloor h/m \rfloor$
7: $q \leftarrow \lfloor g/m \rfloor$
8: $e \leftarrow a - pc + 3qd$
9: $f \leftarrow b - qc - pd - 2qd$
10: return $e, f$

| Algorithm 5 Splitting method |
|---|
| 1: INPUT: $k, P \in E(F_{3^n})$ |
| 2: OUTPUT: $kP$ |
| 3: Use algorithm 7 to compute signed $\tau$-adic representation of $k = \sum_{i=0}^{l-1} k_i \tau^i$ |
| 4: if $l$ is odd then |
| 5: $\quad l \leftarrow l + 1$ |
| 6: $\quad k_{l-1} \leftarrow 0$ |
| 7: end if |
| 8: $Q = \tau^{\frac{l}{2}}(P)$ |
| 9: Precomputation $P+Q, P-Q, -P-Q, -P+Q$ ▷ Points $-P-Q$ and $-P+Q$ are the inverse to $P+Q$ and $P-Q$ |
| 10: $R \leftarrow O$ |
| 11: for $i \leftarrow l/2 - 1, 0$ do |
| 12: $\quad R \leftarrow \tau R$ |
| 13: $\quad S \leftarrow k_{l/2+i} Q + k_i P$ ▷ $S$ is precomputed |
| 14: $\quad R \leftarrow R + S$ |
| 15: end for |
| 16: return($R$) |

PUBLIC KEY GENERATION METHOD IN ELLIPTIC CURVE CRYPTOGRAPHY AND PUBLIC KEY GENERATION SYSTEM EXECUTING THE METHOD

CROSS-REFERENCE TO RELATED APPLICATION

This application claims the benefit under 35 U.S.C. §119 (a) of a Korean Patent Application No. 10-2006-0128663, filed on Dec. 15, 2006, in the Korean Intellectual Property Office, the entire disclosure of which is hereby incorporated by reference.

BACKGROUND OF THE INVENTION

1. Field of the Invention

The present invention relates to a public key generation method in Elliptic Curve Cryptography (ECC), and a public key generation system performing the method. More particularly, the present invention relates to a public key generation method which can quickly compute a public key using an elliptic curve over finite fields of characteristic three.

2. Description of Related Art

Public key cryptography, introduced by W. Diffei and M. Hellman in 1976, is an asymmetrical method using different keys during encryption and decryption. The public key encryption uses two keys, a public key and a private key. The public key is used for encrypting a message, and the private key being used for decrypting a ciphertext into the original message.

The RSA algorithm and the Merkle-Hellman algorithm, are presently endorsed in terms of security as the public key encryption method.

Elliptic curve cryptography is an approach to public key cryptography based on the algebraic structure of elliptic curves over finite fields. The use of elliptic curves cryptography was proposed by Neal Koblitz and Victor Miller in 1985. The discrete logarithm problem on the elliptic curve is believed to be more difficult than the corresponding problem in the multiplicative group of nonzero elements of the underlying finite field. Thus, the keys chosen in elliptic curve cryptography can be much shorter for a comparable level of security.

For example, the RSA algorithm requires a 1024 bit key and an ECC algorithm requires a 160 bit key for a comparable level of security. Accordingly, the usage of elliptic curve cryptography can improve the performance of the existing solutions for the wireless Internet and IC cards.

FIG. 1 illustrates an example of a conventional public key cryptography method based on ECC.

Two user terminals 101 and 102 respectively include private keys 103 and 104, and include a common generator P (not illustrated). In this case, the first user terminal 101 may generate a public key aP 105 using the common generator P and the first user terminal's 101 own private key 103, and the second user terminal 102 may generate a public key bP 106 using the common generator P and the second user terminal's 102 own private key 104.

The user terminals 101 and 102 exchange the generated public keys aP 105 and bP 106 with each other to generate common encryption keys a(bP) 107 and b(aP) 108. In other words, the user terminals 101 and 102 have a common key abP to share.

However, the conventional art fails to take full advantage of the improved performance capabilities of keys in elliptic curve cryptography while maintaining a comparable level of security.

Accordingly, there is a need for an improved public key generation method wherein a public key may be quickly computed by reducing a sequence length of a private key represented in signed ternary τ-adic expansion and optimizing the public key by applying a splitting algorithm to a public key whose sequence is reduced.

SUMMARY OF THE INVENTION

Exemplary embodiments of the present invention address at least the above problems and/or disadvantages to provide at least the advantages described below. Accordingly, an aspect of exemplary embodiments of the present invention is to provide a public key generation method and a system for executing the method which can quickly compute a public key by a private key which is represented in the τ-adic expansion using an elliptic curve over fields of characteristic three.

An aspect of exemplary embodiments of the present invention is the signed ternary representation of the scalar 'k' in the fields of characteristic three.

An aspect of exemplary embodiments of the present invention also provides a public key generation method and a system for executing the method which can generate a public key by applying the splitting algorithm to a private key which is represented in the τ-adic expansion.

According to an aspect of exemplary embodiments of the present invention, there is provided a public key generation method in Elliptic Curve Cryptography (ECC) including representing a secret key 'k' in a signed ternary τ-adic representation; reducing a sequence length of the signed ternary τ-adic representation of the private key 'k' using the properties of the elliptic curve including Frobenius mapping and characteristic equation; and computing a public key kP by multiplying the τ-adic representation of the private key 'k' whose sequence length is reduced on a point P.

According to an aspect of exemplary embodiments of the present invention, the private key 'k', having been represented by the τ-adic representation, $$k = k_0 + k_1\tau + \ldots + k_{l-1}\tau^{l-1}, \quad \text{[Equation 1]}$$

where l indicates the sequence length, and $k_i (0 \leq i \leq l-1)$ indicates an element of a set including 0, 1, and −1, and τ is a complex number solution of the characteristic equation [Equation 5].

According to another aspect of exemplary embodiments of the present invention, the reducing of the sequence length of the τ-adic representation of the private key 'k' performed by finding α which satisfies the Equation 2.

$$\alpha = k \bmod \tau^n - 1 \ kP = \alpha[\tau]P. \quad \text{[Equation 2]}$$

The private key 'k' is chosen around $3^n$, α[τ] denotes α in the signed ternary τ-adic representation.

According to still another aspect of exemplary embodiments of the present invention, the elliptic curve is represented as, $$y^2 = x^3 + 2x^2 + 2, \quad \text{[Equation 3]}$$

the Frobenius mapping is represented as, $$\tau(x,y) = (x^3, y^3) \quad \text{[Equation 4]}$$

where the (x, y) indicates the point P on the elliptic curve, and the characteristic equation is represented as, $$\tau^2 = 2\tau - 3. \quad \text{[Equation 5]}$$

According to another aspect of exemplary embodiments of the present invention, there is provided a public key generation system in Elliptic Curve Cryptography (ECC) including a private key representation module representing a private key 'k' in a signed ternary τ-adic representation; a sequence length reducing module reducing a sequence length of the signed ternary τ-adic representation of the private key 'k'; and a public key computation module computing a public key kP by multiplying a point P on the elliptic curve by the signed ternary τ-adic representation of the private key 'k' whose sequence length is decreased.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which:

FIG. 2 illustrates an example of a τ-adic representation of a scalar;

FIG. 3 illustrates computing a public key using a private key in a τ-adic representation;

FIG. 5 illustrates an example of an algorithm which obtains a signed ternary τ-adic representation;

FIG. 6 illustrates an example of an algorithm whose residue with respect to a complex number is an output;

FIG. 7 illustrates an example of a splitting algorithm optimizing a public key.

Throughout the drawings, the same drawing reference numerals will be understood to refer to the same elements, features, and structures.

DETAILED DESCRIPTION OF EXEMPLARY EMBODIMENTS

Figure 1:
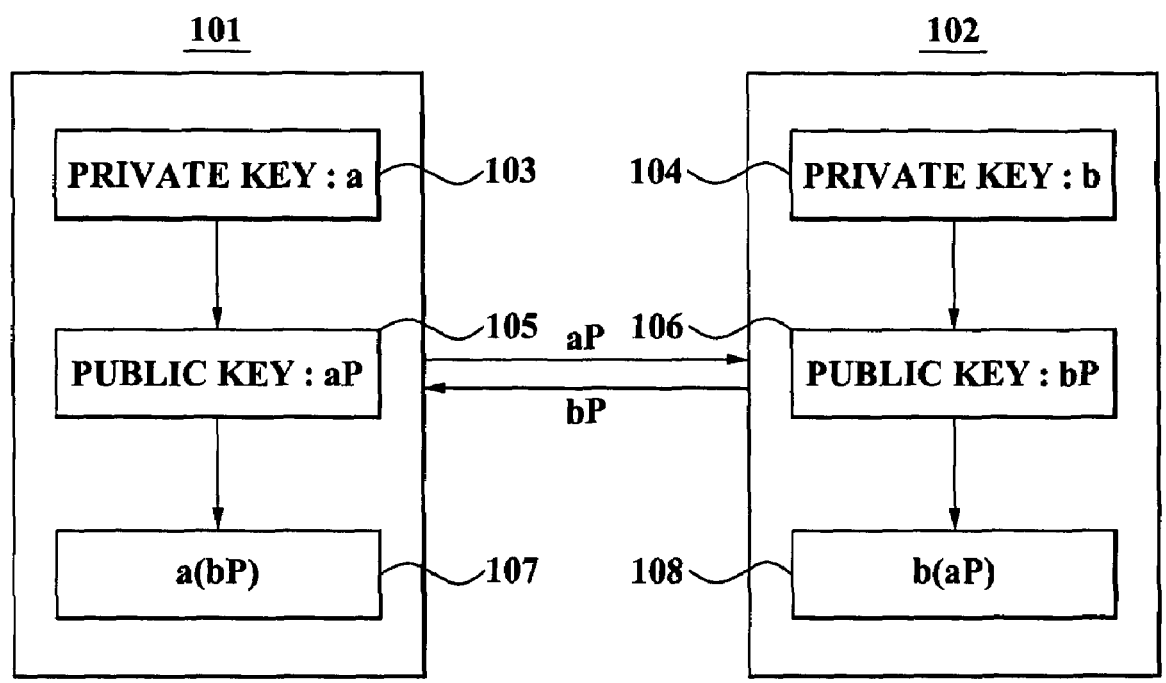
FIG. 1 illustrates an example of a conventional public key cryptography based on Elliptic Curve Cryptography (ECC)

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the fields of characteristic three, a cubing operation is much quicker than multiplication or exponentiation. An ordinary elliptic curve on $F_3$ may be generated in accordance with the following Equation 6:

$$y^2 = x^3 + ax^2 + bx + c, \quad \text{[Equation 6]}$$

where 'a' and 'c' are not '0', affine addition, affine doubling, and affine tripling may be generated in accordance with the following Equations 7 through 9:

$$\text{affine addition: } (x_1, y_1) + (x_2, y_2) = (x_3, y_3): \quad \text{[Equation 7]}$$
$$\lambda = \frac{y_2 - y_1}{x_2 - x_1}$$
$$x_3 = \lambda^2 - a - x_1 - x_2$$
$$y_3 = \lambda(x_1 - x_3) - y_1, \text{ and}$$

$$\text{affine doubling: } 2(x_1, y_1) = (x_2, y_2): \quad \text{[Equation 8]}$$
$$\lambda = \frac{2ax_1 + b}{2y_1}$$
$$x_2 = \lambda^2 - a - 2x_1$$
$$y_2 = \lambda(x_1 - x_2) - y_1, \text{ and}$$

$$\text{affine tripling: } 3(x_1, y_1) = 2(x_1, y_1) + (x_1, x), \quad \text{[Equation 9]}$$

where Table 1 denotes the cost of multiplication with respect to each of the affine addition, affine doubling, and affine tripling.

TABLE 1

| Operation | Cost |
| --- | --- |
| Affine addition | 3M + 1I |
| Affine doubling | 3M + 1I |
| Affine tripling | 6M + 2I |

In Table 1, M denotes complexity for multiplication, and I denotes inversion complexity.

FIG. 2 illustrates an example of a τ-adic representation of a scalar.

An elliptic curve E, generated as in Equation 6, is defined on $F_{3^n}$, which is a finite field. The elliptic curve also includes point $(x^3, y^3)$ when point P=(x, y) exists on the elliptic curve, and has a feature as in Equation 10 according to Equations 7 through 9.

$$(x^9, y^9) - t(x^3, y^3) + 3(x,y) = O. \quad \text{[Equation 10]}$$

When a Frobenius mapping is defined as Equation 11, Equation 10 may be represented as, $$\tau(x,y) = (x^2, y^3), \text{ and} \quad \text{[Equation 11]}$$

$$\tau(\tau(P)) - t\tau(P) + 3P = O, \quad \text{[Equation 12]}$$

where all of the points are elements of E.

Equation 12 denotes that a solution of Equation 12 may be acquired by a solution of Equation 13.

$$\tau^2 - t\tau + 3 = O. \quad \text{[Equation 13]}$$

A solution of Equation 13 is a complex number as in Equation 14, $$\tau = \frac{t + \sqrt{t^2 - 4 \cdot 3}}{2}, \quad \text{[Equation 14]}$$

accordingly a solution of Equation 12 is represented as in Equation 15, $$\tau(P) = \frac{t + \sqrt{t^2 - 4 \cdot 3}}{2} P. \quad \text{[Equation 15]}$$

By combining the Frobenius mapping with complex multiplication, multiplication for the points on the elliptic curve by any element of a ring $Z[\tau]$ may be performed. Accordingly the scalar 'k' can be represented as, $$k=k_0+k_1\tau+\ldots+k_{l-1}\tau^{l-1}, \quad \text{[Equation 16]}$$

where $k_i (0 \leq i \leq l-1)$ denotes an element of a set including 0, 1, and 2.

Namely, Equation 17 can be verified through Equation 16, and Equation 17 can be represented as, $$kP = \sum_{i=0}^{l-1} k_i \tau^i(P). \quad \text{[Equation 17]}$$

$$kP = \tau(\ldots\tau(\tau(\tau(k_{l-1}P)+k_{l-2}P)+k_{l-3}P)\ldots+k_1P)+k_0P. \quad \text{[Equation 18]}$$

In Equation 18, since multiplication by $\tau$ is implemented by cubing, it is essentially free when $F_{3^n}$ is represented in terms of the normal basis, and thus this method provides a more efficient method than one that uses tripling of the point for calculation of public key kP.

The representation of the k base $\tau$ as in Equation 16 is called $\tau$-adic representation. This representation could be found by using the following observation:

$a+b\tau$ is divided by $\tau$ if and only if a=0 and mod 3. Equations 19 and 20 show this.

$$\frac{1}{\tau} = \frac{t-\tau}{3}, \text{ and} \quad \text{[Equation 19]}$$

$$\frac{a+b\tau}{\tau} = \frac{a}{\tau}+b = \frac{a(t-\tau)}{3}+b. \quad \text{[Equation 20]}$$

This observation leads to algorithm 1 (200) of FIG. 2 that will output the sequence of Equation 19.

If 'k' is chosen around $3^n$, the length of the $\tau$-adic representation obtains 2n, and density of the non-zero positions obtains 2/3. Algorithm 1 (200) of FIG. 2 uses the $\tau$-adic representation to compute kP. To use algorithm 1 (200) of FIG. 2, it required to represent an input of the algorithm as 'a' whose initial value is 1, and 'b' whose initial value is 0.

FIG. 3 illustrates computing a public key using a private key in a $\tau$-adic representation.

The algorithm 1 (200) of FIG. 2 and algorithm 2 (300) of FIG. 3 are basic versions of algorithms to quickly compute the public key kP, and an average complexity of the algorithm 2 (300) of FIG. 3 can be represented as, $$\frac{4n}{3}A + l\tau M. \quad \text{[Equation 21]}$$

where 'A' denotes a complexity of adding, and the $\tau M$ denotes a complexity of $\tau$-mapping.

Figure 4:
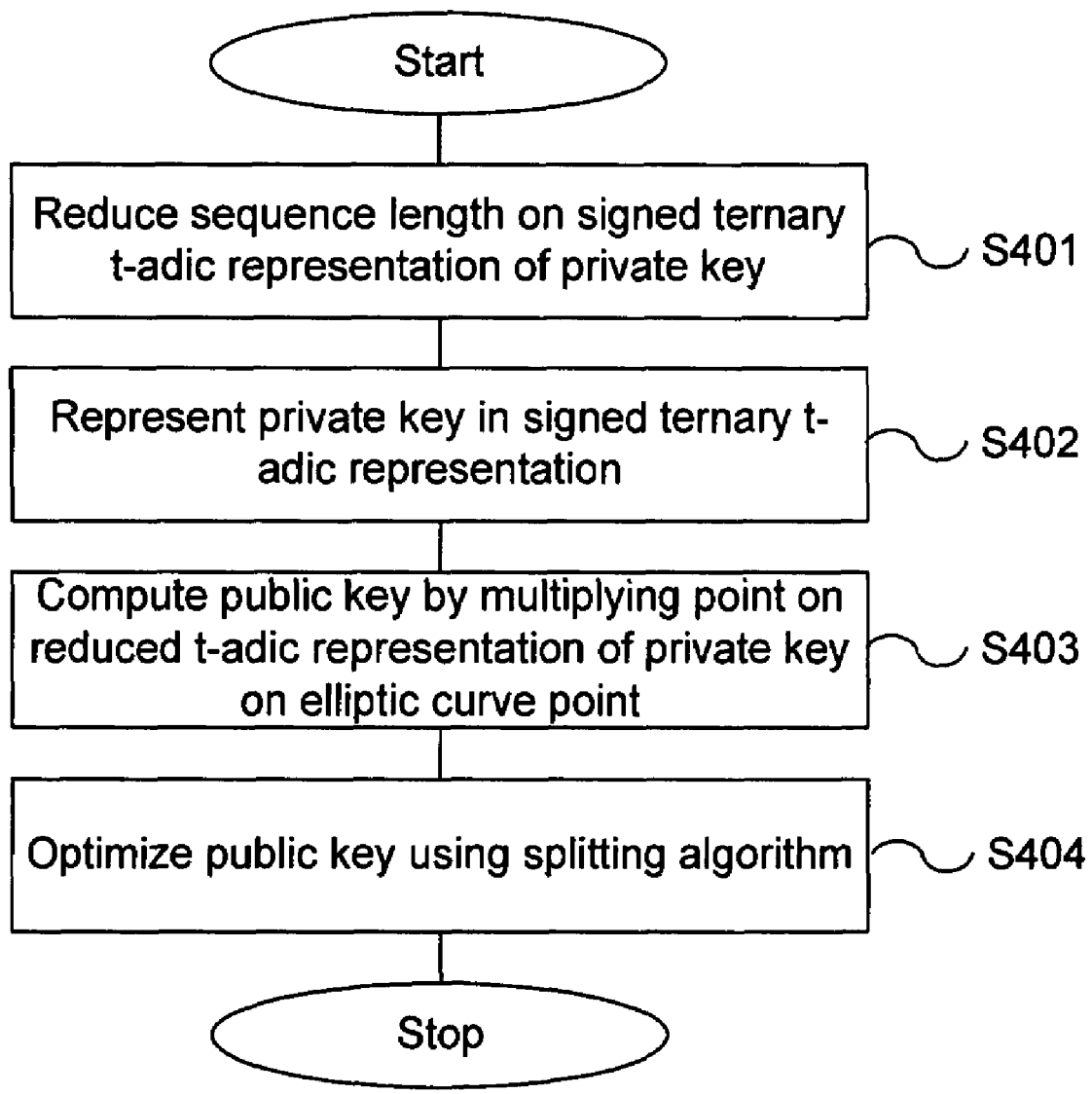
FIG. 4 illustrates an example of a public key generation method according to an exemplary embodiment of the present invention.

FIG. 4 illustrates an example of a public key generation method according to an exemplary embodiment of the present invention.

In operation S401, the public key generation system reduces a sequence length of the signed ternary $\tau$-adic representation of the private key 'k' using properties of the elliptic curve.

In this instance, properties of the Frobenius mapping may be represented as, $$\tau^n(x,y)=(x^{3^n},y^{3^n})=(x,y), \quad \text{[Equation 23]}$$

$$\tau^n P = P, \quad \text{[Equation 24]}$$

$$\tau^n = 1. \quad \text{[Equation 24]}$$

After being based on the Frobenius mapping and Equation 26, when $\alpha[\tau]$ denotes $\alpha$ in the $\tau$-adic representation from Equation 27, the length of the signed ternary $\tau$-adic representation of 'k' may be reduced using Equation 27.

$$\alpha = k \bmod \tau^n - 1, \text{ and} \quad \text{[Equation 26]}$$

$$kP = \alpha[\tau]P. \quad \text{[Equation 27]}$$

Where the private key 'k' is chosen around $3^n$, the sequence length of the signed $\tau$-adic representation may be reduced by half. To find $\alpha$, when the representation of $\tau^n - 1$ in the form $\alpha+b\tau$ is computed, an algorithm that will output $\alpha \bmod \beta$ over complex numbers is required.

FIG. 6 illustrates an example of an algorithm whose residue with respect to a complex number is an output.

In algorithm 4 (600) of FIG. 6, the representation of $\tau^n - 1$ in the form $\alpha+b\tau$ could be found easily by iterative repeating of Equation 28, $$T_k = tT_{k-1} - 3T_{k-2}, \quad \text{[Equation 28]}$$

where $T_0 = 0$, $T_1 = 1$, $k \leq 2$, and the final result obtained from Equation 29, $$\tau^n = T_n\tau - 3T_{n-1}. \quad \text{[Equation 29]}$$

To illustrate algorithm 4 (600) of FIG. 6, the elliptic curve from Equation 30 is taken, then t=2, wherein $$y^2 = x^3 + 2x^2 + 2. \quad \text{[Equation 30]}$$

The characteristic equation is represented as Equation 31, $$\tau^2 = 2\tau - 3. \quad \text{[Equation 31]}$$

A solution of Equation 31 is represented as Equation 32, wherein $$\tau = 1 + \sqrt{2}i. \quad \text{[Equation 32]}$$

To find $\alpha \bmod \beta$ the conjugate to complex $\beta = c + d\tau$ should be found. The conjugate is $C+2d-d\tau$. Namely, Equation 34 is represented as follows by multiplying a nominator by denominator of Equation 33, $$\frac{a+b\tau}{c+d\tau}, \text{ and} \quad \text{[Equation 33]}$$

$$\frac{a+b\tau}{c+d\tau} = \frac{(a+b\tau)(c+2d-d\tau)}{(c+d\tau)(c+2d-d\tau)} \quad \text{[Equation 34]}$$
$$= \frac{(-ad+bc)\tau + ac + 2ad + 3bd}{(c+d)^2 + 2d^2}.$$

In this instance, a residue with respect to a complex number can be obtained by the following algorithm 4 (600) of FIG. 6 using Equation 35.

In operation S402, the public key generation system, generating a public key, represents the reduced private key 'k' in a signed ternary $\tau$-adic representation.

In this case, algorithm 2 of FIG. 3 may be improved by eliminating the operation of precomputation 2P of FIG. 3. This is possible since the inverse point to P=(x, y) on the elliptic curve in $F_{3^n}$ is a point $-P=(x, -y)$. To utilize this property, algorithm 1 of FIG. 2 is required to modify to obtain the signed ternary representation. The reduced private 'k' may be represented as, $$k = k_0 + k_1\tau + \ldots + k_{l-1}\tau^{l-1}, \quad \text{[Equation 35]}$$

where $k_i (0 \leq i \leq l-1)$ is an element of a set including 0, 1, and −1.

This sequence can be obtained by an example of an algorithm which is illustrated on FIG. 5. This second method is to modify algorithm 1 of FIG. 2. A sequence length, obtained from algorithm 3 (400) of FIG. 5, increases by one more than a sequence length of algorithm 1 (200) of FIG. 2 by substituting algorithm 1 (200) of FIG. 2 with algorithm 3 (400) of FIG. 5. Consequently, the public key kP is obtained by applying algorithm 3 (400) of FIG. 5 without the operation of precomputation 2P.

In operation S403, the public key generation system computes a public key kP by multiplying a point P on the elliptic curve by the τ-adic representation of the reduced private key 'k' whose sequence length is reduced. The public key kP is represented as, $$kP = k_{l-1}\tau^{l-1}(P) + k_{l-2}\tau^{l-2}(P) + \ldots k_1\tau^1(P) + k_0\tau^0(P). \quad \text{[Equation 36]}$$

In operation S403, the public key generation system optimizes the public key kP using a splitting algorithm. Specifically, the public key generation system separates the computed public key kP into two parts, and generates an optimized public key using the splitting algorithm.

FIG. 7 illustrates an example of a splitting algorithm optimizing a public key.

Algorithm 5 (700) of FIG. 7 illustrates an expanded method of the above described signed ternary τ-adic representation of the private key 'k'. For this, a public key kP, that is a sequence of the τ-adic representation as Equation 36, may be separated into two parts as Equation 37 as follows:

$$kP = \qquad\qquad\qquad\qquad\qquad\qquad\qquad \text{[Equation 37]}$$
$$k_{l-1}\tau^{l-1}(P) + \ldots + k_{\frac{(l-1)}{2}+1}\tau^{\frac{(l-1)}{2}+1}(P) + k_{\frac{(l-1)}{2}}\tau^{\frac{(l-1)}{2}}(P) +$$
$$k_{\frac{(l-1)}{2}-1}\tau^{\frac{(l-1)}{2}-1}(P) + \ldots + k_1\tau^1(P) + k_0\tau^0(P)$$

In this instance, the public key kP, by using Q which is represented as Equation 38, may represent the public key kP as Equation 39, and an upper sequence and a lower sequence in Equation 39 may be combined with each other as in Equation 40:

$$Q = \tau^{\frac{(l-1)}{2}}(P), \quad \text{[Equation 38]}$$

$$kP = k_{(l-1)}\tau^{\frac{(l-1)}{2}}(Q) + k_{l-2}\tau^{\frac{(l-1)}{2}-1}(Q) + \quad \text{[Equation 39]}$$
$$\ldots + k_{\frac{(l-1)}{2}+1}\tau^1(Q) + k_{\frac{(l-1)}{2}}\tau^0(Q) +$$
$$k_{\frac{(l-1)}{2}-1}\tau^{\frac{(l-1)}{2}-1}(P) + \ldots + k_1\tau^1(P) + k_0\tau^0(P) =, \text{ and}$$

$$kP = \tau^{\frac{(l-1)}{2}}(k_{l-1}Q) + \tau^{\frac{(l-1)}{2}-1}\left(k_{l-2}Q + k_{\frac{(l-1)}{2}-1}P\right) + \quad \text{[Equation 40]}$$
$$\ldots + \tau^1\left(k_{\frac{(l-1)}{2}+1}Q + k_1P\right) + \tau^0\left(k_{\frac{(l-1)}{2}}Q + k_0P\right).$$

A main property of an obtained sequence in Equation 40 is that a sequence length of the obtained sequence may be reduced by half. This is possible by formulating algorithm 5 (700) of FIG. 7 of computing the public key kP to use the representation of Equation 40. There are 2 n/2 iterations in algorithm 5 (700) of FIG. 7.

In this instance, an average complexity with respect to the algorithm 3 (400) of FIG. 5 and algorithm 5 (700) of FIG. 7 is represented as, $$2A + \frac{2n}{2}A + 2n\tau M. \quad \text{[Equation 41]}$$

Through complexity of Equation 41 and Equation 21, it is seen that the signed ternary τ-adic algorithm may compute the public key kP faster than a basic τ-adic algorithm. Namely, the private key is represented in the signed ternary τ-adic representation, the splitting method is applied, and consequently the public key kP can be quickly computed.

Also, in operation S401, the average complexity according to an embodiment of the present invention is represented as in Equation 42, an embodiment of the present invention including operation of the reducing of the sequence length of the signed ternary τ-adic representation of the private key 'k', using the elliptic curve, the Frobenius mapping, and the characteristic equation.

$$2A + \frac{n}{2}A + n\tau M. \quad \text{[Equation 42]}$$

It is seen that the average complexity is reduced since a sequence length is reduced by half in comparison to Equation 41. Cost of multiplication in field operation, where M is the multiplication complexity and τM is the complexity of the τ-mapping, which is the sequence length, determines speed in generating the public key kP.

As described above, according to the public key generation method of an exemplary embodiment of the present invention, a public key may be quickly computed by reducing a sequence length of the signed ternary τ-adic representation of the private key 'k' using an elliptic curve, a Frobenius mapping which is represented as a ternary number, and a characteristic equation in ECC based on a signed ternary, and an optimized public key may be generated by applying a splitting algorithm to the computed public key using a private key whose sequence length is reduced.

Figure 8:
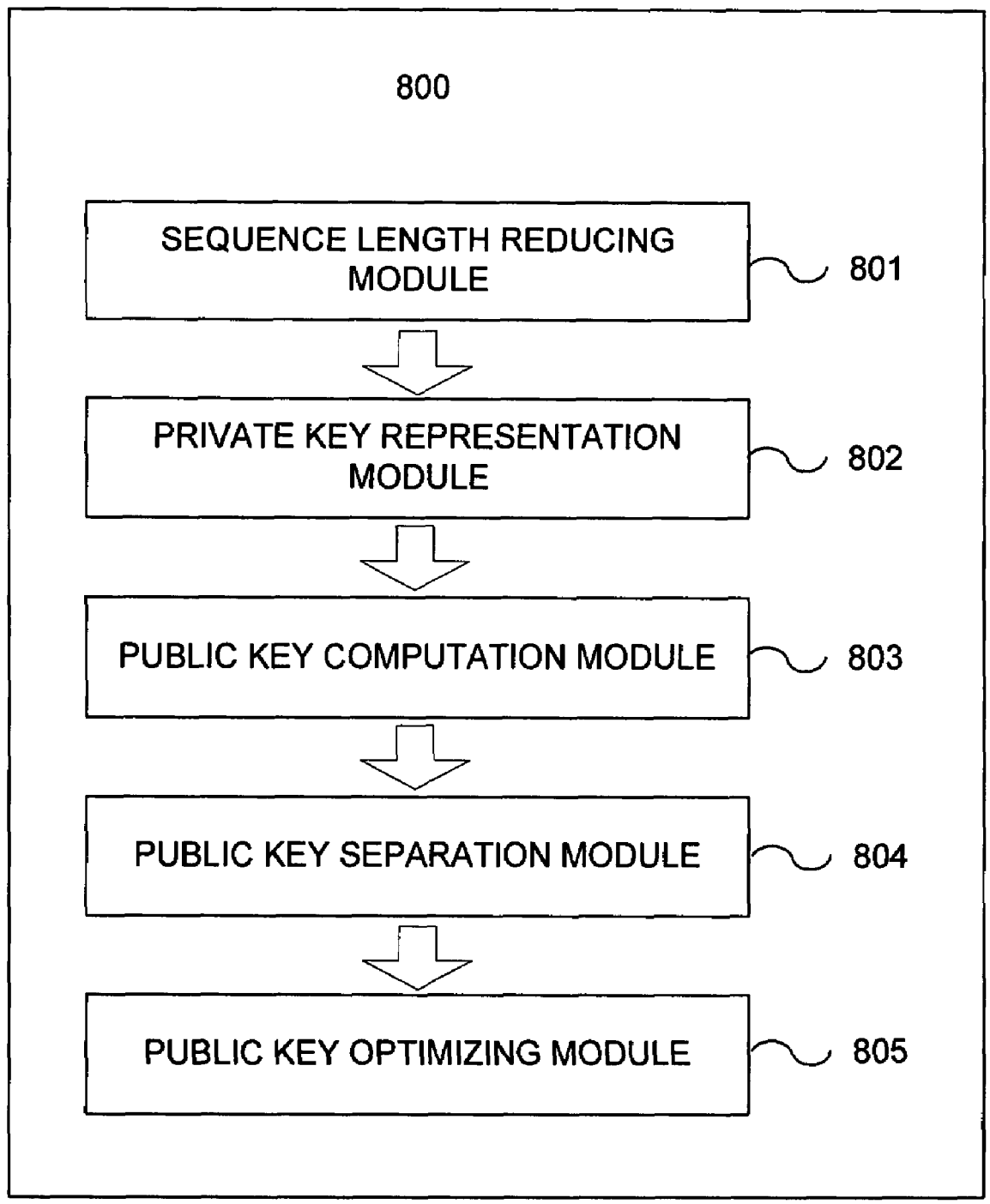
FIG. 8 illustrates an inner configuration of a public key generation system according to another exemplary embodiment of the present invention.

FIG. 8 illustrates an inner configuration of a public key generation system 800 according to another embodiment of the present invention. The public key generation system 800 may include a private key representation module 801, a sequence length reducing module 802, a public key computation module 803, a public key separation module 804, and a public key optimizing module 805.

The sequence length reducing module 801 reduces a sequence length of the signed ternary τ-adic representation of the private key 'k', using an elliptic curve, a Frobenius mapping, and a characteristic equation.

In this instance, the Frobenius mapping may be represented as, $$\tau^n(x,y) = (x^{3^n}, y^{3^n}) = (x,y), \quad \text{[Equation 43]}$$

$$\tau^n P = P, \quad \text{[Equation 44]}$$

$$\tau^n = 1, \quad \text{[Equation 45]}$$

$$\alpha = k \bmod \tau^n - 1, \text{ and} \quad \text{[Equation 46]}$$

$$kP = \alpha[\tau]P. \quad \text{[Equation 47]}$$

When the private key 'k' is chosen around $3^n$, the sequence length of the signed τadic representation may be reduced in half. To find α, when the representation of $\tau^n-1$ in the form of α+bτ is computed, an algorithm will output α mod β. The algorithm 4 (600) of FIG. 6 can be used for the algorithm.

The private key representation module 802 represents a reduced secret key 'k' in a signed ternary τ-adic representation. In this instance, algorithm 2 (300) of FIG. 3 may be improved by eliminating the operation of precomputation 2P in algorithm (300) of FIG. 3. This is possible since the inverse point to P=(x, y) on the elliptic curve in $F_{3^n}$ is a point −P=(x, −y). To utilize this property, algorithm 1 (200) of FIG. 2, is required to be modified to obtain the signed ternary representation. The reduced private 'k' may be represented as, $$k=k_0+k_1\tau+\ldots+k_{l-1}\tau^{l-1},$$ [Equation 43]

where $k_i (0 \leq i \leq l-1)$ is an element of a set including 0, 1, and −1.

The reduced private key 'k' typed in Equation 43 may be obtained using algorithm 3 (400) of FIG. 5. A sequence length, obtained from algorithm 3 (400) of FIG. 5, increases by one more than a sequence length of algorithm 1 (200) of FIG. 2 by substituting algorithm 1 (200) of FIG. 2 with the algorithm 3 (400) of FIG. 5. Consequently, the public key kP is obtained by applying algorithm 3 (400) of FIG. 5 without the operation of precomputation 2P.

The public key computation module 803 computes the public key kP by multiplying a point P on the elliptic curve by the τ-adic representation of the private key 'k' whose sequence length is reduced. The public key kP is represented as, $$kP=k_{l-1}\tau^{l-1}(P)+k_{l-2}\tau^{l-2}(P)+\ldots k_1\tau^1(P)+k_0\tau^0(P).$$ [Equation 49]

The public key separation module 804 separates the computed public key kP into two parts. Namely, the public key separation module 804 may separate the computed public key kP into two parts, that is, a sequence of the τ-adic representation as Equation 49, may be separated into two parts by Equation 50.

$$kP = k_{l-1}\tau^{l-1}(P)+\ldots+k_{\frac{(l-1)}{2}+1}\tau^{\frac{(l-1)}{2}+1}(P)+k_{\frac{(l-1)}{2}}\tau^{\frac{(l-1)}{2}}(P)+ \\ k_{\frac{(l-1)}{2}-1}\tau^{\frac{(l-1)}{2}-1}(P)+\ldots+k_1\tau^1(P)+k_0\tau^0(P)$$ [Equation 50]

The public key optimizing module 805 generates an optimized public key using a splitting algorithm. In this instance, the public key optimizing module 805, by using Q which is represented as Equation 51, may represent the public key kP as Equation 52, and an upper sequence and a lower sequence in Equation 52 may be combined with each other as Equation 53.

$$Q = \tau^{\frac{(l-1)}{2}}(P),$$ [Equation 51]

$$kP = k_{(l-1)}\tau^{\frac{(l-1)}{2}}(Q)+k_{l-2}\tau^{\frac{(l-1)}{2}-1}(Q)+ \\ \ldots+k_{\frac{(l-1)}{2}+1}\tau^1(Q)+k_{\frac{(l-1)}{2}}\tau^0(Q)+ \\ k_{\frac{(l-1)}{2}-1}\tau^{\frac{(l-1)}{2}-1}(P)+\ldots+k_1\tau^1(P)+k_0\tau^0(P) =, \text{ and}$$ [Equation 52]

$$kP = \tau^{\frac{(l-1)}{2}}(k_{l-1}Q)+\tau^{\frac{(l-1)}{2}-1}\left(k_{l-2}Q+k_{\frac{(l-1)}{2}-1}P\right)+ \\ \ldots+\tau^1\left(k_{\frac{(l-1)}{2}+1}Q+k_1P\right)+\tau^0\left(k_{\frac{(l-1)}{2}}Q+k_0P\right).$$ [Equation 53]

A main property of an obtained sequence in Equation 53 is that a sequence length of the obtained sequence may be reduced by half. This is possible to formulate with algorithm 5 (700) of FIG. 7 by computing the public key kP that will use the representation of Equation 53. There are 2 n/2 iterations in algorithm 5 (700) of FIG. 7. Namely, the sequence length with respect to the public key kP is reduced, which means speed for computing the public key kP is increased.

As described above, according to the public key generation method of an exemplary embodiment of the present invention, a public key may be quickly computed by reducing a sequence length of the signed ternary τ-adic representation of the private key 'k' using an elliptic curve, a Frobenius mapping which is represented as a ternary number, and a characteristic equation in ECC based on a signed ternary, and an optimized public key may be generated by applying a splitting algorithm to the computed public key using a private key whose sequence length is reduced.

The public key generation method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an exemplary embodiment of the present invention, a public key may be quickly computed by reducing a sequence length of a private key represented in signed ternary a τ-adic expansion.

Also, according to an exemplary embodiment of the present invention, an optimized public key may be generated by applying a splitting algorithm to a public key whose sequence length is reduced.

While certain exemplary embodiments of the invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A public key generation method in Elliptic Curve Cryptography (ECC), the method comprising:

reducing a sequence length of a private key 'k' in a τ-adic representation by using properties of an elliptic curve over fields of characteristic three;

representing the reduced private key 'k' in a signed ternary τ-adic representation; and computing a public key (kP) by multiplying the τ-adic representation of the reduced private key 'k' on point P.

2. The method of claim 1, wherein the reducing of the sequence length of the τ-adic representation of the private key 'k' using properties of the elliptic curve comprises:

finding α which satisfies the equation α=k mod τ$^n$−1, where when the private key 'k' is chosen around 3$^n$, α[τ] denotes α in the signed ternary τ-adic representation; and reducing the sequence length using α.

3. The method of claim 1, wherein the reduced private key 'k', having been represented by the τ-adic representation, is generated in accordance with equation k=k$_0$+k$_1$τ+ . . . +k$_{l-1}$τ$^{l-1}$, where l indicates the sequence length, and k$_i$(0≦i≦l−1) indicates an element of a set including 0, 1, and −1.

4. The method of claim 1, wherein the elliptic curve is generated in accordance with the equation y$^2$=x$^3$+2x$^2$+2.

5. The method of claim 1, wherein a Frobenius mapping is generated in accordance with the equation τ(x,y)=(x$^3$,y$^3$), where (x, y) indicate the point P on the elliptic curve.

6. The method of claim 1, wherein a characteristic equation is generated in accordance with the equation τ$^2$=2τ−3.

7. The method of claim 1, further comprising:

optimizing the public key (kP) using a splitting algorithm.

8. The method of claim 7, wherein the optimizing of the public key kP using the splitting algorithm comprises:

separating the computed public key (kP) into two parts in accordance with the equation $$kP = k_{l-1}\tau^{l-1}(P) + k_{l-2}\tau^{l-2}(P) + \ldots k_1\tau^1(P) + k_0\tau^0(P) =$$
$$k_{l-1}\tau^{l-1}(P) + \ldots + k_{\frac{(l-1)}{2}+1}\tau^{\frac{(l-1)}{2}+1}(P) + k_{\frac{(l-1)}{2}}\tau^{\frac{(l-1)}{2}}(P) +$$
$$k_{\frac{(l-1)}{2}-1}\tau^{\frac{(l-1)}{2}-1}(P) + \ldots + k_1\tau^1(P) + k_0\tau^0(P);$$

and generating an optimized public key using the splitting algorithm, generated in accordance with the equation $$kP = \tau^{\frac{(l-1)}{2}}(k_{l-1}Q) + \tau^{\frac{(l-1)}{2}-1}\left(k_{l-2}Q + k_{\frac{(l-1)}{2}-1}P\right) +$$
$$\ldots + \tau^1\left(k_{\frac{(l-1)}{2}+1}Q + k_1P\right) + \tau^0\left(k_{\frac{(l-1)}{2}}Q + k_0P\right);$$

where $Q$ indicates $\tau^{\frac{(l-1)}{2}}(P)$.

9. A non-transitory computer-readable recording medium storing a program for implementing a public key generation method, comprising:

a first set of instructions configured to reduce a sequence length of a signed ternary τ-adic representation of a private key 'k' and representing a reduced private key 'k' in the signed ternary τ-adic representation; and a second set of instructions configured to compute a public key (kP) by multiplying the τ-adic representation of the private key 'k' whose sequence length is reduced on point P of an elliptic curve.

10. The non-transitory computer readable recording medium of claim 9, further comprising a set of instructions configured to find α, which is obtained from the equation α=k mod τ$^n$−1, where, when the private key 'k' is chosen around 3$^n$, α[τ] denotes α in the signed ternary τ-adic representation.

11. The non-transitory computer readable recording medium of claim 9, further comprising a set of instructions configured to generate the reduced private key 'k', represented by the τ-adic representation, in accordance with the equation k=k$_0$+k$_1$τ+ . . . +k$_{l-1}$τ$^{l-1}$, where l indicates the sequence length, and k$_i$(0≦i≦l−1) indicates an element of a set including 0, 1, and −1.

12. The non-transitory computer readable recording medium of claim 11, further comprising:

a set of instructions configured to generate the elliptic curve in accordance with the equation y$^2$=x$^3$+2x$^2$+2; and a set of instructions configured to generate a characteristic equation in accordance with the equation τ$^2$=2τ−3.

13. The non-statutory computer readable recording medium of claim 11, further comprising:

a set of instructions configured to separate the computed public key (kP) into two parts in accordance with the equation $$kP = k_{l-1}\tau^{l-1}(P) + k_{l-2}\tau^{l-2}(P) + \ldots k_1\tau^1(P) + k_0\tau^0(P) =$$
$$k_{l-1}\tau^{l-1}(P) + \ldots + k_{\frac{(l-1)}{2}+1}\tau^{\frac{(l-1)}{2}+1}(P) + k_{\frac{(l-1)}{2}}\tau^{\frac{(l-1)}{2}}(P) +$$
$$k_{\frac{(l-1)}{2}-1}\tau^{\frac{(l-1)}{2}-1}(P) + \ldots + k_1\tau^1(P) + k_0\tau^0(P);$$

and a set of instructions configured to generate, using a splitting algorithm, an optimized public key (kP) generated in accordance with the following equation $$kP = \tau^{\frac{(l-1)}{2}}(k_{l-1}Q) + \tau^{\frac{(l-1)}{2}-1}\left(k_{l-2}Q + k_{\frac{(l-1)}{2}-1}P\right) +$$
$$\ldots + \tau^1\left(k_{\frac{(l-1)}{2}+1}Q + k_1P\right) + \tau^0\left(k_{\frac{(l-1)}{2}}Q + k_0P\right);$$

where $Q$ indicates $\tau^{\frac{(l-1)}{2}}(P)$.

14. A public key generation system in Elliptic Curve Cryptography (ECC), the system comprising:

a sequence length reducing module configured to reduce a sequence length of a signed ternary τ-adic representation of a private key 'k' using properties of an elliptic curve;

a private key representation module configured to represent the private key 'k' in the signed ternary τ-adic representation; and a public key computation module configured to compute a public key (kP) by multiplying a point P on the elliptic curve by the signed ternary τ-adic representation of the private key 'k' whose sequence length is decreased, wherein at least one of the sequence length reducing module, the private key representation module, and the public key computation module is implemented as hardware or as a combination of hardware and software.

15. The system of claim 14, wherein the sequence length reducing module finds α, which is obtained from the equation $\alpha = k \mod \tau^n - 1$, where, when the private key 'k' is chosen around $3^n$, $\alpha[\tau]$ denotes $\alpha$ in the signed ternary $\tau$-adic representation.

16. The system of claim 14, wherein the reduced private key 'k', having been represented by the $\tau$-adic representation, is generated in accordance with the equation $k = k_0 + k_1\tau + \ldots + k_{l-1}\tau^{l-1}$, where l indicates the sequence length, and $k_i (0 \leq i \leq l-1)$ indicates an element of a set including 0, 1, and −1.

17. The system of claim 14, wherein the elliptic curve is generated in accordance with the equation $y^2 = x^3 + 2x^2 + 2$, and wherein a characteristic equation is generated in accordance with the equation $\tau^2 = 2\tau - 3$.

18. The system of claim 14, further comprising:
a public key separation module configured to separate the computed public key (kP) into two parts in accordance with the equation $$kP = k_{l-1}\tau^{l-1}(P) + k_{l-2}\tau^{l-2}(P) + \ldots k_1\tau^1(P) + k_0\tau^0(P) =$$

-continued $$k_{l-1}\tau^{l-1}(P) + \ldots + k_{\frac{(l-1)}{2}+1}\tau^{\frac{(l-1)}{2}+1}(P) + k_{\frac{(l-1)}{2}}\tau^{\frac{(l-1)}{2}}(P) +$$
$$k_{\frac{(l-1)}{2}-1}\tau^{\frac{(l-1)}{2}-1}(P) + \ldots + k_1\tau^1(P) + k_0\tau^0(P);$$

and
a public key optimizing module configured to generate, using a splitting algorithm, an optimized public key (kP) generated in accordance with the following equation $$kP = \tau^{\frac{(l-1)}{2}}(k_{l-1}Q) + \tau^{\frac{(l-1)}{2}-1}\left(k_{l-2}Q + k_{\frac{(l-1)}{2}-1}P\right) +$$
$$\ldots + \tau^1\left(k_{\frac{(l-1)}{2}+1}Q + k_1P\right) + \tau^0\left(k_{\frac{(l-1)}{2}}Q + k_0P\right);$$

where $Q$ indicates $\tau^{\frac{(l-1)}{2}}(P)$.

* * * * *